(12) United States Patent
Ramme et al.

(10) Patent No.: US 6,821,336 B1
(45) Date of Patent: Nov. 23, 2004

(54) ELECTRICALLY CONDUCTIVE CONCRETE AND CONTROLLED LOW STRENGTH MATERIALS HAVING CARBON FIBERS

(75) Inventors: Bruce W. Ramme, Okauchee, WI (US); John J. Noegel, Grafton, WI (US); Richard H. Setchell, Jr., Brookfield, WI (US); Robert F. Bischke, Cottage Grove, WI (US)

(73) Assignee: Wisconsin Electric Power Co., Milwaukee, WI (US)

( * ) Notice: Subject to any disclaimer, the term of this patent is extended or adjusted under 35 U.S.C. 154(b) by 0 days.

(21) Appl. No.: 10/641,979

(22) Filed: Aug. 15, 2003

(51) Int. Cl.[7] .......................... C04B 14/38; C04B 7/13; C04B 18/06

(52) U.S. Cl. ........................ 106/709; 106/707; 106/717; 106/DIG. 1; 252/502; 252/510

(58) Field of Search ................................ 106/707, 709, 106/DIG. 1; 252/502, 510

(56) References Cited

U.S. PATENT DOCUMENTS

| | | |
|---|---|---|
| 3,573,427 A | 4/1971 | Minsk |
| 3,962,142 A | 6/1976 | Freeman et al. |
| 4,050,261 A | 9/1977 | Brewer et al. |
| 4,116,705 A | 9/1978 | Chappell |
| 4,125,410 A | 11/1978 | Natsuume |
| 4,205,993 A | 6/1980 | Rosenberg et al. |
| 4,210,457 A | 7/1980 | Dodson et al. |
| 4,230,568 A | 10/1980 | Chappell |
| 4,268,316 A | 5/1981 | Wills, Jr. |
| 4,374,672 A | 2/1983 | Funston et al. |
| 4,559,881 A | 12/1985 | Lankard et al. |
| 4,731,120 A | 3/1988 | Tuutti |
| 4,786,388 A | 11/1988 | Tatum, Jr. |
| 5,026,508 A | 6/1991 | Tatum, Jr. et al. |
| 5,032,181 A * | 7/1991 | Chung ........................ 106/717 |
| 5,062,897 A * | 11/1991 | Katsumata et al. ......... 106/696 |
| 5,080,773 A | 1/1992 | Tatum, Jr. et al. |
| 5,106,422 A | 4/1992 | Bennett et al. |
| 5,294,255 A | 3/1994 | Smetana et al. |
| 5,308,696 A * | 5/1994 | Hanashita et al. .......... 428/357 |
| 5,346,012 A | 9/1994 | Heathman et al. |
| 5,346,547 A | 9/1994 | McCormack |
| 5,366,600 A * | 11/1994 | Westhof et al. ............. 205/734 |
| 5,374,308 A | 12/1994 | Kirkpatrick et al. |
| 5,447,564 A | 9/1995 | Xie et al. |
| 5,490,889 A | 2/1996 | Kirkpatrick et al. |
| 5,501,819 A * | 3/1996 | Westhof et al. ............. 252/503 |
| 5,520,730 A | 5/1996 | Barbour |
| 5,652,058 A * | 7/1997 | Nagata et al. ............... 428/378 |
| 5,679,149 A * | 10/1997 | Tezuka et al. ............... 106/644 |
| 5,685,902 A * | 11/1997 | Tezuka et al. ............... 106/643 |
| 5,686,181 A * | 11/1997 | Takano et al. ............... 428/367 |
| 5,853,475 A | 12/1998 | Liskowitz et al. |
| 5,855,663 A * | 1/1999 | Takano et al. ............... 106/688 |
| 5,908,584 A | 6/1999 | Bennett |
| 5,951,751 A | 9/1999 | Williams et al. |
| 6,461,424 B1 | 10/2002 | Ramme et al. |
| 6,749,682 B2 * | 6/2004 | Mattus ........................ 106/819 |
| 2003/0200903 A1 * | 10/2003 | Mattus ........................ 106/802 |
| 2004/0099982 A1 * | 5/2004 | Sirola et al. ................. 264/105 |

FOREIGN PATENT DOCUMENTS

| | | |
|---|---|---|
| EP | 0 744 386 A1 | 11/1996 |
| JP | 06-287084 A * | 10/1994 |

OTHER PUBLICATIONS

American Concrete Institute Committee 229, "Controlled Low–Strength Materials", ACI 229R–99, pp. 229R–1 to 229R–15, Jun. 1999.

ASTM C 618–99, "Standard Specification for Fly Ash and Raw or Calcined Natural Pozzolan for Use as a Mineral Admixture in Portland Cement Concrete", Jul. 1999.

B. Ramme et al., "Construction Experience with CLSM Fly Ash Slurry for Underground Facilities", American Concrete Institute Special Pub. No. 153, Jun. 1995, pp. 1–11.

J.G. Cabrera et al., "Design and Properties of High–Volume Fly Ash High–Performance Concrete", American Concrete Institute, SP 186–2, p. 21–37, 1999 (no month).

A.G. Timms et al., "Use of Fly Ash in Concrete", American Society for Testing and Materials Proceedings, vol. 56, pp. 1139–1160, 1956 (no month).

R.E. Davis et al., "Weathering Resistance of Concretes Containing Fly–Ash Cements", Journal of the American Concrete Institute, vol. 12, pp. 281–293, 1941 (no month).

* cited by examiner

*Primary Examiner*—Anthony J. Green
(74) *Attorney, Agent, or Firm*—Quarles & Brady LLP

(57) ABSTRACT

Compositions are provided for increasing the electrical conductivity of concrete or controlled low-strength materials (flowable fill). One composition sets to produce a concrete and includes from 1% to 30% by weight of portland cement; from 1% to 30% by weight of fly ash having a carbon content as measured by loss on ignition of greater than 12%; from 40% to 90% by weight of an aggregate; from 0.1% to 20% by weight of carbon fibers; and water in a sufficient amount such that the composition sets to a concrete. Another composition is a self-compacting, cementitious flowable fill composition that includes from 1% to 30% by weight of portland cement; from 5% to 85% by weight of fly ash; from 0.1% to 20% by weight of carbon fibers; and water in a sufficient amount such that the composition sets to a material having a compressive strength of 8.3 MPa or less.

20 Claims, No Drawings

ELECTRICALLY CONDUCTIVE CONCRETE AND CONTROLLED LOW STRENGTH MATERIALS HAVING CARBON FIBERS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to concrete and controlled low-strength materials having increased electrical conductivity such that when used in construction, the material is capable of conducting electrical charges such as those resulting from a lightning strike. Further, the concrete and controlled low-strength materials include a high carbon content fly ash, thus providing a means for utilization of a product usually considered a by-product, or a waste product, of coal burning power generation.

2. Description of the Related Art

It is known that fly ash can be incorporated into concrete. See, for example, U.S. Pat. Nos. 6,461,424, 4,116,705, 4,268,316, 5,520,730, 5,853,475, 5,346,012, 5,490,889, 5,374,308, 4,230,568, 4,050,261 and 4,210,457; European patent application EP 744386; Davis et al., "Weathering Resistance of Concretes Containing Fly-Ash Cements", Journal of the ACI, vol. 12, pages 281–293, 1941; Timms et al., "Use of Fly Ash in Concrete", ASTM Proceedings, 1956; and Cabrera et al., "Design and Properties of High-Volume Fly Ash High-Performance Concrete", American Concrete Institute, SP 186-2, p. 21–37, 1999. In most of these patents and publications, the fly ash utilized comprises any of those fly ashes which meet the requirements of ASTM (American Society for Testing and Materials) C 618, "Standard Specification for Fly Ash and Raw or Calcined Natural Pozzolan for Use as a Mineral Admixture in Portland Cement Concrete."

It is also known that fly ash can be incorporated into controlled low-strength materials (often referred to as "CLSM"). In the publication "Controlled Low-Strength Materials", reported by American Concrete Institute Committee 229, June 1999, there is provided a description of controlled low-strength materials along with certain ingredient mixtures used to produce CLSM. Controlled low-strength materials are broadly defined in this publication as self-compacted, cementitious materials used primarily as a backfill in place of compacted fill. Conventional CLSM mixtures usually consist of water, portland cement, fly ash, and fine or coarse aggregates. Some CLSM mixtures consist of water, portland cement and fly ash. However, CLSM is not to be considered as a type of low-strength concrete. This publication also defines CLSM as a material that results in a compressive strength of 8.3 MPa (1200 psi) or less at the conventional 28 day testing period (typically without compaction), and notes that most current CLSM applications require unconfined compressive strengths of 2.1 MPa (300 psi) or less at the conventional 28 day testing period in order to allow future excavation. This publication makes reference to certain examples of CLSM mixtures which include fly ash. U.S. Pat. Nos. 5,951,751 and 4,374,672 also disclose the use of fly ashes which meet the requirements of ASTM C 618 in controlled low-strength materials.

It is also known that fly ash is a voluminous by-product of coal burning electrical power generation plants, presenting a possible environmental disposal issue. While those fly ash varieties which meet the requirements of the ASTM Standard Specification C 618 for classes C and F are used as additives to concrete, those fly ash materials which have an excessively high carbon content may not be so used. Accordingly, much of this type of fly ash is relegated to land fill, a less than desirable solution from an environmental viewpoint.

Air dried concrete is considered a reasonably good electrical insulator, having a resistivity on the order of $10^6$ ohm-cm, with oven dried concrete having a resistivity on the order of $10^{11}$ ohm-cm. Moist concrete, on the other hand is an electrolyte having a resistivity on the order of $10^4$ ohm-cm, which leads to its classification as a semiconductor. Since the transmission of electrical charge in moist concrete occurs through the movement of dissolved ions in the electrolytic solution, higher cement content and higher water content result in lower resistivity. High water content, however, is not acceptable for structural concrete, since it also results in lowered compressive strength and density. It has been found that there is a direct relationship between the degree of hydration of the cement paste and resistivity, yielding a linear relationship between resistivity and compressive strength of cement paste and concrete. That is, resistivity increases as the compressive strength increases.

Electrically conductive concrete may be produced by placing electrically conductive fibers and/or particles in close contact with each other so that a conductive network may be formed throughout the concrete. In conductive concrete, the transmission of electrical charge occurs mainly through the conductive additives, rather than through the electrolytic solution created in moist concrete. Such additives as carbon fibers, steel fibers, steel shavings, and carbon black have been found to be effective in modifying the conductivity of concrete into which they are blended. For example, U.S. Pat. No. 3,962,142 teaches the use of calcined oil coke and acetylene black aggregates in conductive concrete having satisfactory mechanical strength, while U.S. Pat. No. 5,908,584 teaches a mixture of graphite, amorphous carbon, and sand, comprising 25 to 75% of a cementitious composite useful for conducting floors, heating elements, and ground connectors.

Electrically conductive concrete and controlled low-strength materials would be advantageous where lowered electrical resistance may be sought, such as for use in structures where it is necessary to protect electrical equipment from lightning strikes. Accordingly, a means to reduce the electrical resistance of concrete or controlled low-strength materials, or to increase the conductivity thereof, is of interest in the building industry, for example. Further, since high carbon content fly ash is readily available as a waste product, and carbon is known to be highly conductive, the use of fly ash and carbon fibers as additives to concrete or controlled low-strength materials to lower electrical resistance have now been investigated.

SUMMARY OF THE INVENTION

The need for concrete having increased electrical conductivity is met by a composition according to the invention that is capable of setting to produce electrically conductive concrete. The composition includes from about 1% to about 30% by weight of portland cement; from about 1% to about 30% by weight of fly ash having a carbon content as measured by loss on ignition of greater than 12%; from about 40% to about 90% by weight of an aggregate; from about 0.1% to about 20% by weight of carbon fibers; and water in a sufficient amount such that the composition sets to a concrete having a compressive strength of at least 13.8 MPa, wherein all weight percentages are percent by weight of the total composition.

In another aspect, the invention satisfies the need for a controlled low-strength material having increased electrical conductivity. In this regard, the invention provides a self-compacting, cementitious flowable fill composition that includes from about 1% to about 30% by weight of portland cement; from about 5% to about 85% by weight of fly ash; from about 0.1% to about 20% by weight of carbon fibers; and water in a sufficient amount such that the composition sets to a material having a compressive strength of 8.3 MPa or less, wherein all weight percentages are percent by weight of the total composition. Preferably, the fly ash has a carbon content as measured by loss on ignition of greater than 12%.

Thus, it is an advantage of the present invention to provide an inexpensive method for providing electrically conductive construction materials.

It is a further advantage to provide an economically advantageous means of beneficial utilization of a waste by-product.

It is another advantage to provide electrically conductive concrete that can be inexpensively manufactured, and to provide a dry concrete mixture that may be packaged for sale to the public for individual use by consumers wishing to provide an electrically conductive concrete structural element.

It is yet another advantage to provide a dry mix for a conductive concrete which can be inexpensively packed, delivered, mixed and used.

These and other features, aspects, and advantages of the present invention will become better understood upon consideration of the following detailed description and appended claims.

DETAILED DESCRIPTION OF THE INVENTION

The present invention is directed to concrete and controlled low-strength material having increased electrical conductivity. It has been discovered that controlled low-strength materials and concrete can be made less electrically resistant by the addition of carbon fibers and fly ash, preferably fly ash having a high carbon content. When using the term "carbon content in fly ash", the carbon content is as measured by loss on ignition. By the term "high carbon content", it is meant that the carbon content of the fly ash is greater than 12% by weight. The carbon fibers and the carbon present in such fly ash provide an electrical pathway throughout the concrete and controlled low-strength material for conduction of electricity, without a severe deleterious effect upon mechanical properties, such as compressive strength, thus permitting the use of the electrically conductive concrete and controlled low-strength materials in construction.

Electrical properties of concrete are of concern in some applications where inadequate resistivity of concrete affects electrical signaling systems, such as railway ties, or in structures in which concrete is used for protection from stray currents. Electrical properties of concrete are also of interest in such applications as cathodic protection of reinforced concrete; electrical grounding; deicing of airport runways, and bridge decks, by electrical heating; and non-destructive testing of concrete.

As is well known in the art, conventional concrete is a dense hard hydrated mass produced from mixtures of portland cement, coarse aggregate, fine aggregate, and water. Concrete mixtures generally use only sufficient water to make the mixture placeable and to yield hardened concrete having a compressive strength of at least 13.8 MPa (2000 psi.) after 28 days. Portland cement is a well known cement that upon mixing with water binds or unites the other materials present in the mixture into concrete. The portland cement is typically a Type I, II, III, IV and V portland cement. The coarse aggregate conventionally comprises particles that are greater than about 0.375 inches (9.5 millimeters) in size and may be gravel, granite, limestone, shale, and the like. The fine aggregate employed in portland cement concretes is most often sand (silica) comprised of particles less than about 0.375 inches (9.5 millimeters) in size, typically equal to or less than about 0.1875 inches (4.76 millimeters) in size.

A concrete in accordance with the present invention is formed from a composition including portland cement, aggregate, water, and high carbon content fly ash and carbon fibers that provide an electrical pathway throughout the concrete for conduction of electricity, without a severe deleterious effect upon mechanical properties, such as compressive strength. One example embodiment of the invention is a composition capable of setting to produce a concrete wherein the composition includes (1) from about 1% to about 30% by weight of portland cement; (2) from about 1% to about 30% by weight of fly ash having a carbon content as measured by loss on ignition of greater than 12%; (3) from about 40% to about 90% by weight of an aggregate; (4) from about 0.1% to about 20% by weight of carbon fibers, and (5) water in a sufficient amount such that the composition sets to a concrete having a compressive strength of at least 13.8 MPa (2000 psi.), wherein all weight percentages are percent by weight of the total composition. The amount of portland cement, aggregate, water, high carbon content fly ash, and carbon fibers can be varied in the above weight percentages depending on the physical properties desired in the concrete.

Preferably, the composition according to the invention that is capable of setting to produce a concrete includes from about 1% to about 20% by weight of portland cement, and most preferably from about 1% to about 10% by weight of portland cement. Preferably, the composition according to the invention that is capable of setting to produce a concrete includes from about 1% to about 20% by weight of fly ash having a carbon content as measured by loss on ignition of greater than 12%, and most preferably from about 1% to about 10% by weight of fly ash having a carbon content as measured by loss on ignition of greater than 12%.

Preferably, the composition according to the invention that is capable of setting to produce a concrete includes from about 60% to about 80% by weight of aggregate, and most preferably, the composition includes from about 30% to about 40% coarse aggregate, which comprises particles that are greater than about 0.375 inches (9.5 millimeters) in size and may be gravel, granite, limestone, shale, and the like, and from about 30% to about 40% fine aggregate, which may be sand (silica) comprised of particles equal to or less than about 0.375 inches (9.5 millimeters) in size, typically equal to or less than about 0.1875 inches (4.76 millimeters) in size.

Preferably, the composition according to the invention that is capable of setting to produce a concrete includes from about 0.1% to about 10% by weight of carbon fibers, and most preferably from about 0.1% to about 5% by weight of carbon fibers. The composition according to the invention that is capable of setting to produce a concrete includes from about 5% to about 50% by weight of water, preferably from about 5% to about 35% by weight of water, and most preferably from about 5% to about 20% by weight of water. Optionally, the composition according to the invention that is capable of setting to produce a concrete includes from about 1% to about 10% by weight of a water reducing admixture suitable for use in hydraulic cement compositions. Examples of such water reducing admixtures can be found in U.S. Pat. Nos. 4,205,993 and 4,125,410.

A composition according to the invention that is capable of setting to produce a concrete can produce, upon setting, a concrete having an electrical resistivity of not more than 30,000 ohm-centimeters, preferably, not more than 10,000 ohm-centimeters, and most preferably, not more than 1,000 ohm-centimeters.

A controlled low-strength material in accordance with the invention shares properties with both soils and concrete. The CLSM is prepared from materials (i.e., portland cement, water, optionally coarse aggregate, and optionally fine aggregate) similar to the concrete described above but also exhibits properties of soils. The specific properties of the CLSM depend on the ingredients in the mixture. The flowability of CLSM distinguishes it from other fill materials. Because of the flowability of the CLSM, the CLSM is self-leveling and self-compacting, i.e., the CLSM does not need conventional placing and compacting equipment. One version of a composition according to the invention for producing a CLSM in accordance with the present invention results in a CLSM having a compressive strength of 8.3 MPa (1200 psi) or less at the conventional 28 day testing period, while another version of a composition according to the invention produces a CLSM in accordance with the present invention that has unconfined compressive strengths of 2.1 MPa (300 psi) or less at the conventional 28 day testing period in order to allow future excavation.

One controlled low-strength material in accordance with the present invention is formed from a composition including portland cement, water, and fly ash and carbon fibers that provide an electrical pathway throughout the controlled low-strength material for conduction of electricity, without a severe deleterious effect upon mechanical properties, such as compressive strength. Another controlled low-strength material in accordance with the present invention is formed from a composition including portland cement, water, and a high carbon content fly ash and carbon fibers.

One example embodiment of the invention is a self-compacting, cementitious flowable fill composition capable of setting to produce a controlled low-strength material according to the present invention wherein the composition includes (1) from about 1% to about 30% by weight of portland cement; (2) from about 5% to about 85% by weight of fly ash; (3) from about 0.1% to about 20% by weight of carbon fibers, and (4) water in a sufficient amount such that the composition sets to a material having a compressive strength of 8.3 MPa (1200 psi) or less. The amount of portland cement, water, fly ash, and carbon fibers can be varied in the above weight percentages depending on the physical properties desired in the controlled low-strength material.

Preferably, the self-compacting, cementitious flowable fill composition includes from about 1% to about 20% by weight of portland cement, and most preferably from about 1% to about 10% by weight of portland cement. The fly ash is preferably a fly ash having a carbon content as measured by loss on ignition of greater than 12%. Preferably, the self-compacting, cementitious flowable fill composition includes from about 5% to about 45% by weight of fly ash having a carbon content as measured by loss on ignition of greater than 12%, and most preferably from about 20% to about 30% by weight of fly ash having a carbon content as measured by loss on ignition of greater than 12%. Optionally, the self-compacting, cementitious flowable fill composition includes from about 40% to about 90% by weight of aggregate, and preferably may include from about 55% to about 75% aggregate such as gravel, granite, limestone, shale, sand and the like.

Preferably, the self-compacting, cementitious flowable fill composition includes from about 0.1% to about 10% by weight of carbon fibers, and most preferably from about 0.1% to about 5% by weight of carbon fibers. The self-compacting, cementitious flowable fill composition may include from about 25% to about 95% by weight of water, preferably from about 40% to about 90% by weight of water, and most preferably from about 60% to about 80% by weight of water.

A self-compacting, cementitious flowable fill composition according to the invention is capable of setting to produce a material having an electrical resistivity of not more than 6000 ohm-centimeters, preferably, not more than 1000 ohm-centimeters, and most preferably, not more than 100 ohm-centimeters.

A conductive concrete or controlled low-strength material produced in accordance with the present invention has many applications. For example, in one application, conductive concrete or controlled low-strength materials can be used as a substitute for materials which are used to absorb and ground various types of energy for military and other government applications. These uses may include absorption of direct energy, energy feedback and amplification, and EMP pulses. The conductive concrete or controlled low-strength materials would replace or supplement traditionally used grounding materials and be connected by grounding loops. Due to the engineering properties of the conductive concrete or controlled low-strength materials, the absorption should cover the entire energy range of the electromagnetic spectrum.

A conductive concrete or controlled low-strength material produced in accordance with the invention also would be beneficial when used in structures that may be struck by lightning. Lightning research photographs indicate that the initial lightning energy dissipates in 15 to 60 meter channels longitudinally across the surface of the earth. This is in contrast to the perception that all energy conducts into a finite earth point. The image appears similar to multiple lava flow channels emanating from a single volcano cone. Present buried grid systems not only do not prevent these phenomena, but may in fact enhance the effect. It suggests that earth's inability to absorb large energy transfer at a finite point within the extremely short time event contributes to dangerous and damaging voltage scenarios. Extremely high voltage gradients result in physical structure and electronic equipment failures and indicate the need for an improved conduction transfer media to couple lightning energy to the earth. A conductive concrete or controlled low-strength material produced in accordance with the invention: (1) provides for low inductance, low resistance and subsequently low impedance values for all frequencies up to 1 Mhz; (2) conducts energy efficiently across and through its surface without damage while providing true equalized ground potential rise values; (3) conducts energy efficiently into the earth quickly and seamlessly by providing the lowest impedance-coupling path; (4) provides for long term, high strength physical properties; and (5) is compatible with copper, aluminum and galvanized steel products. Specific applications include: (1) microwave, radio, and cellular sites; (2) electrical power and substation plants; (3) electric distribution poles; and (4) high tech building systems.

Microwave, radio, and cellular site towers risk lightning strikes. Using a conductive concrete or controlled low-strength material produced in accordance with the invention in footings and large pads reduces ground potential rise by lowering the impedance between the lightning stroke and the earth. The event duration may also decrease due to shorter energy transfer times. A conductive concrete or controlled low-strength material produced in accordance with the invention could replace the typical wood, metal or standard concrete enclosure. Enhanced protection and reduced electronic equipment damage is achieved through the reduction of unacceptable voltage gradients. Using a conductive concrete or controlled low-strength material produced in accordance with the invention in the radial ground system will enhance energy transfer away from the site. The entire design package reduces risk to site failures thus improving revenue through reduced maintenance. A conductive concrete or controlled low-strength material produced in accordance with the invention will contribute to improved lightning protection efficiency at microwave, radio, TV, and cellular tower sites. Presently, the sites rely on copper wire grounding designs to lower earth resistivity to conduct lightning contacts to ground while providing an equalized ground potential rise within the protected site area. However, voltage gradients continue to exist resulting in equipment and revenue losses.

Electrical power and substation plants require above grade facilities grounded to large buried ground grid systems. This provides for efficient electrical operation of equipment and safe low step and touch ground potentials for operating personnel. Using a conductive concrete or controlled low-strength material produced in accordance with the invention to replace or enhance foundations and buried ground grid systems allows for integral above and below grade ground connections that are efficient, low maintenance, easy to test and resilient to damage. A conductive concrete or controlled low-strength material produced in accordance with the invention would provide high conductance paths for low and high frequency current transfers. Applications requiring low earth resistance values that are difficult to achieve are a particularly attractive solution to achieve satisfactory earth resistance values.

State regulations require electric distribution pole lines to be grounded periodically. While the primary purpose is system protection, stabilization, and elimination of stray voltage problems, surge protection devices connect to the same ground system. This results in a high impedance path for lightning and transient energy conduction. Surrounding the direct buried wood or metal pole base with a conductive concrete or controlled low-strength material produced in accordance with the invention increases fault and lightning protection by providing a low impedance conduction path to earth. In addition, increasing the large contact area between a conductive concrete or controlled low-strength material produced in accordance with the invention and earth enhances conductance, reduces wood pole rot at the earth line, and expedites installation.

The proliferation of "high tech" voice and data systems applications is requiring grounding performance evaluations in commercial facilities. Plastic utility service conduits to commercial and residential facilities remove traditional sources for attaching main ground systems. This increases the risk of communication equipment downtime and damage due to electrical system aberrations and lightning. National standards are directing building designer's attention to providing efficient local ground systems such as external or incorporated grounding rings to replace inefficient ground systems. A conductive concrete or controlled low-strength material produced in accordance with the invention will complement designer's options by allowing building steel components to couple directly to earth via a conductive structural medium. The transfer of lightning energy, stabilized equipotential ground system and presence of an efficient signal reference ground will contribute to high communication performance and reliability.

One especially advantageous use of the present invention is in electrical grounding, or similar, applications. When electrical resistance of the materials is lowered, they will reduce the required length, or entirely replace, the grounding electrodes currently in use for protection of electrical equipment from lightning strikes.

The invention is further illustrated in the following Examples which are presented for purposes of illustration and not of limitation.

EXAMPLES

1. Materials

Materials utilized in the examples consisted of one source of fly ash, cement, clean concrete sand, crushed quartzite limestone aggregates, and carbon fibers.

a. Fine Aggregate

One source of clean concrete sand was utilized as fine aggregate for the CLSM and concrete mixtures. Physical properties of the sand were determined per ASTM C 33 requirements: unit weight (ASTM C 29), specific gravity and absorption (ASTM C 128), fineness (ASTM C 136), material finer than #200 sieve (ASTM C 117), and organic impurities (ASTM C 40). See Tables 1 and 2.

TABLE 1

Gradation of Aggregate (ASTM C 136)

| Sieve Size | % Passing Coarse Aggregate | % Passing Fine Aggregate | ASTM C 33 % Passing for Coarse Aggregate | ASTM C 33 % Passing for Fine Aggregate |
|---|---|---|---|---|
| 1" (25.4 mm) | 100 | — | 100 | — |
| ¾" (19.0 mm) | 95.3 | — | 90–100 | — |
| ½" (12.5 mm) | 60.5 | — | — | — |
| ⅜" (9.5 mm) | 35.6 | 100 | 20–55 | 100 |
| #4 (4.75 mm) | 2.3 | 99.9 | 0–10 | 95–100 |
| #8 (2.36 mm) | 1.0 | 88.6 | 0–5 | 80–100 |
| #16 (1.18 mm) | — | 69.9 | — | 50–85 |
| #30 (600 μm) | — | 49.1 | — | 25–60 |
| #50 (300 μm) | — | 17.7 | — | 10–30 |
| #100 (150 μm) | | 3.0 | | 2–10 |

TABLE 2

Physical Properties of Aggregates

| | Unit Weight (lb/ft³) | Bulk Specific Gravity | SSD Bulk Specific Gravity | Apparent Specific Gravity | SSD Absorption (%) | Percent Void | Fineness Modulus | Material Finer than #200 Sieve (75 μm) (%) | Clay Lumps and Friable Particles (%) | Organic Impurity |
|---|---|---|---|---|---|---|---|---|---|---|
| ASTM Test Designation | C 29 | | C 127/C 128 | | | C 29 | C 136 | C 117 | C 142 | C 40 |
| Fine Aggregate | 110.4 | 2.64 | 2.67 | 2.72 | 1.3 | 38.0 | 2.7 | 0.6 | 0.0 | Passes |
| Coarse Aggregate | 97.6 | 2.66 | 2.67 | 2.70 | 0.7 | 41.2 | 6.7 | — | 0.0 | — | b. Coarse Aggregate

One source of coarse aggregate was utilized for the CLSM and concrete mixtures. The aggregate used for the project was a crushed quartzite limestone with a maximum size of ¾ inch. Complete physical properties of the coarse aggregate were determined per ASTM C 33 requirements: unit weight (ASTM C 29), gradation (ASTM C 136), specific gravity and absorption (ASTM C 127), and material finer than #200 sieve (ASTM C 117). See Tables 1 and 2.

C. Cement

Type I cement (Lafarge Cement Co.) was used throughout this investigation. Its physical and chemical properties were determined in accordance with applicable ASTM test methods. Cement was tested per ASTM C 150 requirements for air content (ASTM C 185), fineness (ASTM C 204), autoclave expansion (ASTM C 151), compressive strength (ASTM C 109), time of setting (ASTM C 191), and specific gravity (ASTM C 188).

d. Fly Ash

One source of fly ash was used for this project (We Energies, Presque Isle Power Plant). This selection was made to represent a typical high-carbon fly ash available from We Energies, Wisconsin, USA. A chemical analysis is provided in Table 3. A physical analysis is provided in Table 4.

TABLE 3

Chemical Analysis of Ash

| Analysis Parameter | Material, % Presque Isle | ASTM C 618 Requirements, % Class N | Class C | Class F |
|---|---|---|---|---|
| Silicon Dioxide, $SiO_2$ | 43.4 | — | — | — |
| Aluminum Oxide, $Al_2O_3$ | 19.5 | | | |
| Iron Oxide, $Fe_2O_3$ | 4.7 | — | — | — |
| $SiO_2 + Al_2O_3 + Fe_2O_3$ | 67.6 | 70.0 Min. | 50.0 Min. | 70.0 Min. |
| Calcium Oxide, CaO | 4.4 | — | — | — |
| Magnesium Oxide, MgO | 1.7 | — | — | — |
| Titanium Oxide, $TiO_2$ | 0.7 | — | — | — |
| Potassium Oxide, $K_2O$ | 0.8 | — | — | — |
| Sodium Oxide, $Na_2O$ | 2.0 | — | — | — |
| Sulfate, $SO_3$ | 0.9 | 4.0 Max. | 5.0 Max. | 5.0 Max. |
| Loss on Ignition, LOI (@ 750 C.) | 20.8 | 10.0 Max. | 6.0 Max. | 6.0 Max. |
| Moisture Content | 0.1 | 3.0 Max. | 3.0 Max. | 3.0 Max. |

TABLE 3-continued

Chemical Analysis of Ash

| Analysis Parameter | Material, % Presque Isle | ASTM C 618 Requirements, % Class N | Class C | Class F |
|---|---|---|---|---|
| Available Alkali, $Na_2O$ Equivalent (ASTM C-311) | — | 1.5 Max. | 1.5 Max. | 1.5 Max. |

TABLE 4

Physical Properties of Ash

| Analysis Parameter | Material Presque Isle | ASTM C 618 Requirements Class N | Class C | Class F |
|---|---|---|---|---|
| Retained on No. 325 Sieve (%) | 36.8 | — | 34 max. | 34 max. |
| Strength Activity Index with Cement (% of Control) | | | | |
| 7-day | 62.0 | 75 min. | 75 min. | 75 min. |
| 28-day | 66.7 | 75 min. | 75 min. | 75 min. |
| Water Requirement, (% of Control) | 104.9 | 115 max. | 105 max. | 105 max. |
| Autoclave Expansion, (%) | −0.01 | 0.8 max. | 0.8 max. | 0.8 max. |
| Density | 2.04 | — | — | — | e. Carbon Fibers

Carbon fibers were used for this project. The fibers used for this project were Panex 33 chopped carbon fibers manufactured by the Zoltek Corporation, St. Louis, Mo., USA. The carbon fibers were pan-type fibers ½ inch long and approximately 0.283 mils (7.2 microns) in diameter. The density of the fibers reported by the manufacturer was 0.065 lb/in³. The carbon fibers also had a water-soluble sizing applied. These carbon fibers were used in one CLSM mixture (Mixture CLSM-B) and in one concrete mixture (Mixture CON—C) to investigate enhancement of the electrical resistance characteristics.

2. Test Procedures a. Manufacturing of CLSM Mixtures

All CLSM ingredients were manually weighed and loaded in a rotating-drum concrete mixer. The required amount of the cement, together with one-half of the specified quantity of fly ash, and all of the carbon fibers were loaded into the mixer and mixed for three minutes. Three-quarters of the specified water was then added to the mixer and the CLSM was mixed for an additional three minutes. The remaining fly ash and water was added to the mixer and mixed for five more minutes. Additional water was added in the mixture as needed for achieving the desired flow, prior to discharging the CLSM for further testing. Whenever additional water was added to obtain the specified fresh CLSM characteristics, the CLSM mixture was mixed for an additional five minutes. The resulting mixture was then discharged into a pan and the CLSM was tested for the final rheological properties, and then test specimens were cast.

b. Manufacturing of Concrete Mixtures

All concrete ingredients were manually weighed and loaded in a laboratory rotating-drum concrete mixer following the procedures of ASTM C 192. A high-range water reducing admixture was used for the concrete mixture to achieve the desired slump. The resulting mixture was then discharged into a pan and the concrete was further tested, and then the test specimens were cast.

c. CLSM Specimen Preparation and Testing

Fresh CLSM properties such as air content (ASTM D 6023), flow (ASTM D 6103), and unit weight (ASTM D 6023) were measured and recorded. Air and CLSM temperature was also measured and recorded. CLSM test specimens were prepared from each mixture for compressive strength (ASTM D 4832) and density. Compressive strength of the CLSM mixtures were evaluated at the designated ages of 3, 7, 14, and 28 days. All test specimens were cast in accordance with ASTM D 4832. Three CLSM test specimens were tested at each test age. These specimens were typically cured for one day in their molds at about 70°±5° F. After setting, the test specimens were then demolded and placed in a standard moist-curing room maintained at 100% R.H. and 73°±3° F. temperature until the time of test.

d. Concrete Specimen Preparation and Testing

Fresh concrete properties were also measured for the mixtures. Properties measured included: air content (ASTM C 237), slump (ASTM C 143), unit weight (ASTM C 138), and temperature (ASTM C 1064). Air and concrete temperature was also measured and recorded. Cylindrical test specimens 6-inch dia.×12-inch length were prepared from each mixture for compressive strength (ASTM C 39) and density tests. All test specimens were cast in accordance with ASTM C 192. Concrete specimens were typically cured for one day in their molds at about 70°±5° F. These specimens were then demolded and placed in a standard moist-curing room maintained at 100% R.H. and 73°±3° F. temperature until the time of test.

e. Electrical Resistance Measurements

In order to test the effect of the moisture on the electrical resistance of the material and the reliability of the measurement, six identical cylinders were made from each CLSM and concrete mixture. Three specimens were left to air dry after demolding and three placed in water to remain in a saturated condition for testing. Both the air-dried and saturated specimens were tested at the same ages for electrical properties. Resistance measurements were taken using a Leader LCR475-01 multimeter at one pre-determined location on all six cylinders for each mixture. The electrical resistance of the cylinders was measured along the 12-inch length of the cylinder through a 6-inch diameter copper plate on both ends. An average was determined for each type of test cylinders. The average result for each test specimen is presented in the Tables of electrical resistance included herein.

f. Reactance Measurement and Calculation of Permeability

Reactance of the test cylinder was measured by placing the cylinder in a copper wire coil and measuring the reactance of the coil with air as the core ($L_1$) and with the test cylinder as the core ($L_2$). The reactance, $L_1$, and $L_2$, were determined using a Leader LCR475-01 multimeter. The measured reactance values were then used to calculate the permeability values from the relationship:

$$\frac{\mu_0}{\mu_1} = \frac{L_1}{L_2} \Rightarrow \mu_1 = \frac{\mu_0 L_2}{L_1}$$

where:

$L_1$=Reactance of the coil with air core $L_2$=Reactance of the coil with the test cylinder as the core $\mu_0$=Permeability of air ($4\pi \times 10^{-7}$ Henry/meter)

$\mu_1$=Permeability of the cylinder g. CLSM Mixture Proportions

Two different types of CLSM mixtures were tested. CLSM mixture proportions and fresh CLSM test results are shown in Table 5. The CLSM mixtures were proportioned to maintain a "practical" value of flow that would not lead to excessive segregation and bleeding. The composition of the two CLSM mixtures were: (1) Mixture CLSM-A: Fly ash (1250 lb/yd$^3$), cement (97 lb/yd$^3$), and water; and (2) Mixture CLSM-B: Fly ash (490 lb/yd$^3$), cement (95 lb/yd$^3$), carbon fibers (23 lb/yd$^3$), and water.

h. Concrete Mixture Proportions

The materials used for producing concrete for this project included a standard clean concrete sand and ¾" coarse aggregate meeting ASTM C33 requirements, Type I cement, high-range water reducing admixture, and carbon fibers. The concrete mixture tested is shown in Table 5 as Mixture CON—C: a concrete mixture containing approximately 40% fly ash by weight of total cementitious materials, a high-range water reducing admixture, and the addition of 14 lb/yd$^3$ of carbon fibers.

TABLE 5

CLSM and Concrete Mixtures

| Mixture N | CLSM-A | CLSM-B | CON-C |
|---|---|---|---|
| Laboratory Mixture Designation | W-1 | WF | WF-C |
| Mixture Description | High-Carbon Fly Ash CLSM | High-Carbon Fly Ash CLSM with Carbon Fibers | High-Carbon Fly Ash Concrete with Carbon Fibers |
| Fly Ash, FA (lb/yd$^3$) | 1250 | 490 | 240 |
| Cement, C (lb/yd$^3$) | 97 | 95 | 330 |
| SSD Fine Aggregate, S (lb/yd$^3$) | — | — | 1200 |
| SSD Coarse Aggregate, G (lb/yd$^3$) | — | — | 1405 |
| Carbon Fibers (lb/yd$^3$) | — | 23 | 14 |
| Fly Ash Content, % [FA/(FA + C)]100 | 93 | 82 | 42 |
| Water, W (lb/yd$^3$) | 1010 | 1370 | 470 |
| High-Range Water Reducing Admixture (oz/yd$^3$) | — | — | 170 |

TABLE 5-continued

CLSM and Concrete Mixtures

| Mixture N | CLSM-A | CLSM-B | CON-C |
|---|---|---|---|
| [W/(C + FA)] | 0.75 | 2.3 | 0.82 |
| Air Temperature (° F.) | 79 | 72 | 73 |
| Fresh CLSM\Concrete | 76 | 60 | 65 |

TABLE 5-continued

CLSM and Concrete Mixtures

| Mixture N | CLSM-A | CLSM-B | CON-C |
|---|---|---|---|
| Temperature (° F.) | | | |
| Flow (in.) | 11 | 8 | — |
| Slump (in.) | — | — | 1 |
| Air Content (%) | 1.7 | 0.6 | 2.0 |
| Unit Weight (lb/ft$^3$) | 87.2 | 73.6 | 135.0 |
| Hardened CLSM/Concrete Density (lb/ft$^3$) | 85 | 90 | 130 |

3. Discussion of Results

A. Mechanical Properties (i) CLSM Compressive Strength

The compressive strength data for the CLSM mixtures are presented in Table 6. Compressive Strength of the high-volume fly ash CLSM mixture (Mixture CLSM-A, fly ash and cement) increased slightly between the ages of 3 and 28 days. Compressive strength for Mixture CLSM-A was 70 psi at the 3-day age, and increased to 85 psi at the 28-day age. When carbon fibers were introduced into the CLSM mixture, compressive strength was significantly reduced, to approximately 10 psi. Testing of CLSM containing the carbon fibers in compression resulted in a ductile failure. During loading, specimens were typically compressed one inch or more before termination of the test. The test specimen typically did not fail in compression in a mode typically observed for CLSM. A desirable compressive strength level of CLSM at the 28-day age, for applications where the CLSM may be required to be later removed at a later age, by the use of hand shovels, is usually specified to be less than 100 psi. A mixture with higher compressive strength would be more difficult to excavate. Therefore, the 28-day strength levels achieved for the CLSM-A and CLSM-B mixtures should not be expected to pose a problem in case of future excavation.

Due to the addition of carbon fibers, the flowability of the CLSM was significantly reduced for Mixture CLSM-B. In order to obtain flow characteristics for a typical CLSM, water for Mixture CLSM-B needed to be increased by approximately 30% over the amount used for Mixture CLSM-A (CLSM without fibers). Reduced flowability is to be expected since the fibers would tend to interlock and restrict the flow of the mixture.

TABLE 6

Compressive Strength of CLSM Mixtures

| Mixture No. | Lab Mixture No. | Fly Ash Content, % [FA/(C + FA)] | Compressive Strength (psi) | | | | | | | |
|---|---|---|---|---|---|---|---|---|---|---|
| | | | 3-day | | 7-day | | 14-day | | 28-day | |
| | | | Actual | Ave. | Actual | Ave. | Actual | Ave. | Actual | Ave. |
| CLSM-A | W-1 | 93 | 75 | 70 | 85 | 75 | 80 | 75 | 85 | 85 |
| | | | 70 | | 70 | | 70 | | 80 | |
| | | | 65 | | 70 | | 75 | | 90 | |
| CLSM-B | WF | 82 | — | — | 10 | 10 | 10 | 10 | 10 | 10 |
| | | | — | | 5 | | 10 | | 10 | |
| | | | — | | 10 | | 10 | | 10 | |

(ii) CLSM Density

The fresh density (i.e., unit weight) for the CLSM mixtures is shown in Table 5. The density of the CLSM was reduced when the carbon fibers were incorporated in the mixture. Density varied between approximately 74 lb/ft$^3$ (Mixture CLSM-B) to 87 lb/ft$^3$ (Mixture CLSM-A). The increase in density for the CLSM without fibers is probably due to the increasing amount of dense fly ash.

(iii) Concrete Mixture

Carbon fibers were introduced in the concrete Mixture CON—C based on approximately 0.5% by volume of concrete. However, using this amount of fibers resulted in concrete that was unworkable. Water was increased and high range water reducing admixture was added in the mixture. This resulted in the water to cementitious materials ratio for the concrete mixture of 0.82, see Table 5. Slump of the concrete mixture was one inch.

(iv) Concrete Compressive Strength

Compressive strength of the concrete was measured using standard cylinders, 6" dia.×12" long, following the method of ASTM C 39. The compressive strength of concrete Mixture CON—C is shown in Table 7. The compressive strength of the mixture was very low at the early age and could not be measured until the age of 16 days. At the age of 16 days, the compressive strength was only 60 psi. The compressive strength increased at the age of 28 days to 135 days, and then significantly increased at the 42-day age to 1345 psi. This indicates that the setting time of the concrete mixture was significantly delayed, as well as pozzolanic effect of 40% fly ash content contributing to this jump in strength. The delay in setting was attributed to the amount of high-range water reducing admixture (HRWRA) required to be added to the mixture. The amount of HRWRA exceeded the maximum amount recommended by the manufacturer (136 oz/yd$^3$ versus 170 oz/yd$^3$ actually used in the laboratory mixture). Another possibility investigated was to determine if the water-soluble sizing of the carbon fibers had any effect on the setting time of the mixtures. The water-soluble sizing is applied to prevent the agglomeration of the fibers.

TABLE 7

Compressive Strength of Concrete Mixture

| Mixture No. | Lab Mixture No. | Fly Ash Content, % [FA/(C + FA)] | Compressive Strength (psi) | | | | | | |
|---|---|---|---|---|---|---|---|---|---|
| | | | 3-day | | 16-day | | 28-day | | 42-day | |
| | | | Actual | Ave. | Actual | Ave. | Actual | Ave. | Actual | Ave. |
| CON-C | WF-C | 42 | — | — | 80 | 60 | 145 | 135 | 1265 | 1345 |
| | | | — | | 50 | | 145 | | 1355 | |
| | | | — | | 50 | | 120 | | 1410 | |

A test was conducted on cement mortar cubes per ASTM C 109 using water that were obtained from soaking the carbon fibers for 24 hour s. The compressive strength of the cement mortar cubes at the age of seven days was 5070 psi. This indicates that the water-soluble sizing probably did not have any time of setting delay effect on the compressive strength of cement mortar. The concrete compressive strength achieved for the Mixture CON—C tested for this example is below its normally expected strength level. The primary focus of this example was to determine the effect of carbon fibers on the electrical properties of the concrete. Therefore, the compressive strength of the mixtures was considered secondary in the study. The amount of fibers can be revised to produce a good-quality structural-grade concrete. The amount of carbon fibers may be reduced and optimized for electrical properties. Compressive strength of the concrete may be increased by increasing the cementitious materials and/or reducing the amount of water in the mixture.

B. Electrical Properties (i) CLSM Mixtures

The electrical measurements and calculations obtained from the CLSM specimens are shown in Tables 8a, 8b, 8c and 9a, 9b, 9c. The electrical measurements and calculations of the CLSM mixtures shown in Table 8a, 8b, 8c are for air-dried specimens and Tables 9a, 9b, 9c are for saturated specimens. Electrical resistance of high-carbon fly ash mixture, CLSM-A, increased from 27 ohms at the age of three days to over 9000 ohms at the age of 28 days. Saturated specimens increased from 27 ohms to only 90 ohms at the age of 28 days. A significant improvement in the electrical resistance of CLSM occurred when carbon fibers were incorporated in Mixture CLSM-B. Both air-dried and saturated specimens exhibited very low resistance of approximately 2 ohms or less when tested at ages between three and 28 days. These results illustrate that using carbon fibers in CLSM has a greater positive effect on lowering the resistance above that normally achieved through the use of high-carbon fly ash alone. Permeability decreased slightly when carbon fibers were used (Mixture CLSM-B).

TABLE 8a

Electrical Resistance of CLSM Mixtures - Air-Dried Specimens

| Mixture No. | Fly Ash Content, % [FA/(C + S + G)] | Resistance (Ohm) | | | | | | | |
|---|---|---|---|---|---|---|---|---|---|
| | | 3-day | | 7-day | | 14-day | | 28-day | |
| | | Act. | Ave | Act. | Ave. | Act. | Ave. | Act. | Ave. |
| CLSM-A | 93 | 27.9 | 27.2 | 76.3 | 99.8 | 561 | 830 | 7470 | 9267 |
| | | 26.7 | | 90.9 | | 752 | | 7280 | |
| | | 28.1 | | 132.3 | | 1178 | | 13050 | |
| CLSM-B | 82 | 1.1 | 1.1 | 1.3 | 1.3 | 1.5 | 1.5 | 2.2 | 2.2 |
| | | 1.0 | | 1.3 | | 1.4 | | 2.2 | |
| | | 1.1 | | 1.3 | | 1.5 | | 2.3 | |

TABLE 8b

Resistivity of CLSM Mixtures - Air-Dried Specimens

| Mixture No. | Fly Ash Content, % [FA/(C + S + G)] | Resistivity (Ohm-cm.) | | | |
|---|---|---|---|---|---|
| | | 3-day Ave. | 7-day Ave. | 14-day Ave. | 28-day Ave. |
| CLSM-A | 93 | 163 | 597 | 4967 | 55,461 |
| CLSM-B | 82 | 7 | 8 | 9 | 13 |

TABLE 8c

Electrical Permeabliity of CLSM Mixtures - Air-Dried Specimens

| Mixture No. | Fly Ash Content, % [FA/(C + S + G)] | Relative Permeability (Permeability of Sample/ Permeability of Air) | | | |
|---|---|---|---|---|---|
| | | 3-day Ave. | 7-day Ave. | 14-day Ave. | 28-day Ave. |
| CLSM-A | 93 | 1.0069 | 1.0075 | 1.0087 | 1.0081 |
| CLSM-B | 82 | 1.0039 | 1.0041 | 1.0029 | 1.0033 |

TABLE 9a

Electrical Resistance of CLSM Mixtures - Saturated Specimens

| Mixture No. | Fly Ash Content, % [FA/(C + S + G)] | Resistance (Ohm) | | | | | | | |
|---|---|---|---|---|---|---|---|---|---|
| | | 3-day | | 7-day | | 14-day | | 28-day | |
| | | Act. | Ave | Act. | Ave. | Act. | Ave. | Act. | Ave. |
| CLSM-A | 93 | 26.7 | 27.1 | 40.0 | 44.1 | 58.5 | 64.1 | 80.6 | 89.5 |
| | | 28.1 | | 49.0 | | 70.3 | | 97.5 | |
| | | 27.4 | | 43.3 | | 63.4 | | 90.4 | |
| CLSM-B | 82 | 1.7 | 1.8 | 1.2 | 1.3 | 1.5 | 1.5 | 1.6 | 1.5 |
| | | 1.5 | | 1.3 | | 1.4 | | 1.6 | |
| | | 2.2 | | 1.3 | | 1.5 | | 1.4 | |

TABLE 9b

Resistivity of CLSM Mixtures - Saturated Specimens

| Mixture No. | Fly Ash Content, % [FA/(C + S + G)] | Resistivity (Ohm-cm.) | | | |
|---|---|---|---|---|---|
| | | 3-day Ave. | 7-day Ave. | 14-day Ave. | 28-day Ave. |
| CLSM-A | 93 | 162 | 264 | 384 | 536 |
| CLSM-B | 82 | 11 | 8 | 9 | 9 |

TABLE 9c

Electrical Permeablity of CLSM Mixtures - Saturated Specimens

| Mixture No. | Fly Ash Content, % [FA/(C + S + G)] | Relative Permeability (Permeability of Sample/Permeability of Air) | | | |
|---|---|---|---|---|---|
| | | 3-day Ave. | 7-day Ave. | 14-day Ave. | 28-day Ave. |
| CLSM-A | 93 | 1.0053 | 1.0072 | 1.0078 | 1.0083 |
| CLSM-B | 82 | 1.0028 | 1.0037 | 1.0034 | 1.0030 |

(ii) Concrete

The electrical measurements obtained for the concrete Mixture CON—C is given in Tables 10a, 10b, 10c and 11 a, 11b, 11c. Electrical resistance of the concrete Mixture CON—C through the age of 42 days was noticeably less than that for the concrete test results previously reported in U.S. Pat. No. 6,461,424. Overall, resistance of both air-dried and saturated specimens were comparable, approximately 7 to 8 ohms at the age of 16 days and 11 to 12 ohms at the age of 42 days. Although the compressive strengths were much lower for the Mixture CON—C than a typical concrete used for many construction applications, the lower resistance values achieved through the incorporation of high-carbon fly ash and carbon fibers are very promising for potential grounding applications. Further refinement of the carbon fiber content to optimize the resistance and strength properties of the concrete is possible without undue experimentation. The permeability values show only a slight increase between 16 and 28 days. The relative electrical permeability of air-dried and saturated specimens were typically within 0.1%.

TABLE 10a

Electrical Resistance of Concrete Mixture - Air-Dried Specimens

| Mixture No. | Fly Ash Content, % [FA/(C + S + G)] | Resistance (Ohm) | | | | | | | |
|---|---|---|---|---|---|---|---|---|---|
| | | 7-day | | 16-day | | 28-day | | 42-day | |
| | | Act. | Ave | Act. | Ave. | Act. | Ave | Act. | Ave. |
| CON-C | 42 | — | — | 7.1 | 7.2 | 7.9 | 8.0 | 12.9 | 12.1 |
| | | — | | 7.2 | | 8.0 | | 11.2 | |

TABLE 10b

Resistivity of Concrete Mixtures - Air-Dried Specimens

| Mixture No. | Fly Ash Content, % [FA/(C + S + G)] | Resistivity (Ohm-cm.) | | | |
|---|---|---|---|---|---|
| | | 7-day Ave. | 16-day Ave. | 28-day Ave. | 42-day Ave. |
| CON-C | 42 | 0 | 43 | 48 | 72 |

TABLE 10c

Electrical Permeabliity of Concrete Mixtures - Air-Dried Specimens

| Mixture No. | Fly Ash Content, % [FA/(C + S + G)] | Relative Permeability (Permeability of Sample/ Permeability of Air) | | | |
|---|---|---|---|---|---|
| | | 7-day Ave. | 16-day Ave. | 28-day Ave. | 42-day Ave. |
| CON-C | 42 | — | 1.00156 | 1.0018 | 1.0027 |

TABLE 11a

Electrical Resistance of Concrete Mixture - Saturated Specimens

| Mixture No. | Fly Ash Content, % [FA/(C + S + G)] | Resistance (Ohm) | | | | | | | |
|---|---|---|---|---|---|---|---|---|---|
| | | 7-day | | 16-day | | 28-day | | 42-day | |
| | | Act. | Ave | Act. | Ave. | Act. | Ave | Act. | Ave. |
| CON-C | 42 | — | — | 8.8 | 8.1 | 8.3 | 7.5 | 10.9 | 11.3 |
| | | — | | 7.4 | | 6.7 | | 11.6 | |

TABLE 11b

Resistivity of Concrete Mixtures - Saturated Specimens

| Mixture No. | Fly Ash Content, % [FA/(C + S + G)] | Resistivity (Ohm-cm.) | | | |
|---|---|---|---|---|---|
| | | 7-day Ave. | 16-day Ave. | 28-day Ave. | 42-day Ave. |
| CONC-C | 42 | 0 | 48 | 45 | 67 |

TABLE 11c

Electrical Permeabliity of Concrete Mixtures - Saturated Specimens

| Mixture No. | Fly Ash Content, % [FA/(C + S + G)] | Relative Permeability (Permeability of Sample/ Permeability of Air) | | | |
|---|---|---|---|---|---|
| | | 7-day Ave. | 16-day Ave. | 28-day Ave. | 42-day Ave. |
| CON-C | 42 | — | 1.0025 | 1.0022 | 1.00297 |

(iii) Dried vs. Saturated Specimens

Measurements taken for saturated CLSM specimens produced significantly smaller resistance values compared to the air-dried specimens when tested without carbon fibers (Mixture CLSM-A). For the dried specimens, the aging process affected the resistance significantly; the older the specimens, the higher the resistance. The aging process affected the dried specimens more than the saturated ones. This indicates adding moisture in the material improves its conductivity. For CLSM and concrete containing carbon fibers, Mixture CLSM-B and CON—C, respectively, air-dried specimens also had a higher electrical resistance, but the difference between saturated and air-dried specimens were much less. Typically the difference between air-dried and saturated specimens were one ohm or less. This may be attributed to the conductivity of the carbon fibers used in the mixtures.

(iv) CLSM vs. Concrete

Electrical properties of the CLSM mixture incorporating carbon fibers, Mixture CLSM-B, showed a smaller electrical resistance than the concrete mixture containing carbon fibers, Mixture CON—C. This observation is true for both the saturated and dried specimens. The permeability measurements are also smaller in the CLSM mixture than the concrete mixture. This indicates that increasing the carbon fiber and high-carbon fly ash content should lower the electrical resistance. The CLSM mixture incorporating high-carbon fly ash alone exhibited a low resistance, particularly when saturated. Using carbon fibers in concrete, such as in Mixture CON—C, also significantly lowered the electrical resistance over test results previously reported in U.S. Pat. No. 6,461,424 when testing concrete using only high-carbon fly ash as an electrically conductive additive. These results also suggest that CLSM and concrete mixtures containing both high-carbon fly ash and carbon fibers have better electrical properties for grounding. By using carbon fibers and high-carbon fly ash together as a conductive additive, lower electrical resistance is achieved by providing improved electrical continuity throughout the CLSM and concrete matrix.

4. Further Observations

A. Electrical Properties

The results of the electrical property tests suggest that using a combination of high-carbon fly ash and carbon fibers provides enhanced electrical properties useful for electrical grounding applications. The cost of carbon fibers can be offset by the relatively inexpensive conductive high-carbon fly ash. Although the fly ash is not pure carbon, it has been shown that using the high-carbon fly ash reduces the electrical resistance of CLSM and concrete. Therefore, if a specific range of resistance is desired for a grounding application, a CLSM and/or concrete mixture could be proportioned to achieve this desired resistance value, by a judicious blend of high-carbon fly ash and carbon fibers.

B. Mechanical Properties

As discussed above for electrical properties, if the amount of carbon fibers could be optimized and reduced by increasing the use of high-carbon fly ash, the mechanical properties of the materials, particularly for concrete, could be improved. The workability (slump) is reduced when using high-amounts of fibers in concrete. A lower addition of carbon fibers in combination with water reducing admixture or superplasticizer should be considered to achieve a higher compressive strength. For CLSM, reducing the fiber content should also reduce the amount of water needed to achieve the desired flow and produce a more economical CLSM mixture.

Therefore, it can be seen that the invention provides a means to increase the conductivity of concrete or controlled low-strength materials. Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A composition capable of setting to produce a concrete, the composition comprising:
    from about 1% to about 30% by weight of portland cement;
    from about 1% to about 30% by weight of fly ash having a carbon content as measured by loss on ignition of greater than 12%;
    from about 40% to about 90% by weight of an aggregate;
    from about 0.1% to about 20% by weight of carbon fibers; and
    water in a sufficient amount such that the composition sets to a concrete having a compressive strength of at least 13.8 MPa,
    wherein all weight percentages are percent by weight of the total composition.

2. The composition of claim 1 wherein:
    the composition sets to a concrete having an electrical resistivity of not more than about 30,000 ohm-centimeters.

3. The composition of claim 1 wherein:
    the composition sets to a concrete having an electrical resistivity of not more than about 10,000 ohm-centimeters.

4. The composition of claim 1 wherein:
    the composition sets to a concrete having an electrical resistivity of not more than about 1,000 ohm-centimeters.

5. The composition of claim 1 comprising:
    from about 1% to about 20% by weight of portland cement;
    from about 1% to about 20% by weight of fly ash having an average carbon content as measured by loss on ignition of greater than 12%;
    from about 40% to about 90% by weight of aggregate;
    from about 0.1% to about 10% by weight of carbon fibers; and
    from about 5% to about 50% by weight of water.

6. The composition of claim 1 comprising:
    from about 1% to about 10% by weight of portland cement;
    from about 1% to about 10% by weight of fly ash having an average carbon content as measured by loss on ignition of greater than 12%;
    from about 60% to about 80% by weight of aggregate;
    from about 0.1% to about 5% by weight of carbon fibers; and
    from about 5% to about 35% by weight of water.

7. The composition of claim 1 comprising:
    from about 1% to about 10% by weight of portland cement;
    from about 1% to about 10% by weight of fly ash having an average carbon content as measured by loss on ignition of greater than 12%;
    from about 30% to about 40% by weight of a fine aggregate having a particle size of 9.5 millimeters or less;
    from about 30% to about 40% by weight of a coarse aggregate having a particle size greater than 9.5 millimeters;
    from about 0.1% to about 5% by weight of carbon fibers; and
    from about 5% to about 20% by weight of water.

8. The composition of claim 7 further comprising:
    from about 1% to about 10% by weight of a water reducing admixture.

9. A self-compacting, cementitious flowable fill composition comprising:
    from about 1% to about 30% by weight of portland cement;
    from about 5% to about 85% by weight of fly ash;
    from about 0.1% to about 20% by weight of carbon fibers; and
    water in a sufficient amount such that the composition sets to a material having a compressive strength of 8.3 MPa or less,
    wherein all weight percentages are percent by weight of the total composition.

10. The composition of claim 9 wherein the fly ash has a carbon content as measured by loss on ignition of greater than 12%.

11. The composition of claim 9 wherein:
    the composition sets to a material having a compressive strength of 2.1 MPa or less.

12. The composition of claim 9 wherein the composition comprises:
    from about 1% to about 30% by weight of portland cement;
    from about 5% to about 85% by weight of fly ash having a carbon content as measured by loss on ignition of greater than 12%;
    from about 0.1% to about 20% by weight of carbon fibers; and
    water in a sufficient amount such that the composition sets to a material having a compressive strength of 8.3 MPa or less,
    wherein all weight percentages are percent by weight of the total composition.

13. The composition of claim 12 wherein:
    the composition further includes from about 40% to about 90% by weight of an aggregate.

14. The composition of claim 13 wherein:
    the aggregate is selected from concrete sand, crushed limestone, and mixtures thereof.

15. The composition of claim 9 wherein:
    the composition sets to a material having an electrical resistivity of not more than about 6000 ohm-centimeters.

16. The composition of claim 9 wherein:
the composition sets to a material having an electrical resistivity of not more than about 1000 ohm-centimeters.

17. The composition of claim 9 wherein:
the composition sets to a material having an electrical resistivity of not more than about 100 ohm-centimeters.

18. The composition of claim 9 wherein the composition comprises:
from about 1% to about 20% by weight of portland cement;
from about 5% to about 45% by weight of fly ash having an average carbon content as measured by loss on ignition of greater than 12%;
from about 0.1% to about 10% by weight of carbon fibers; and
from about 25% to about 95% by weight of water,
wherein all weight percentages are percent by weight of the total composition.

19. The composition of claim 9 wherein the composition comprises:
from about 1% to about 10% by weight of portland cement;
from about 20% to about 30% by weight of fly ash having an average carbon content as measured by loss on ignition of greater than 12%;
from about 0.1% to about 5% by weight of carbon fibers; and
from about 40% to about 90% by weight of water,
wherein all weight percentages are percent by weight of the total composition.

20. The composition of claim 9 wherein the composition comprises:
from about 1% to about 10% by weight of portland cement;
from about 20% to about 30% by weight of fly ash having an average carbon content as measured by loss on ignition of greater than 12%;
from about 0.1% to about 5% by weight of carbon fibers; and
from about 55% to about 75% by weight of water,
wherein all weight percentages are percent by weight of the total composition.

\* \* \* \* \*

UNITED STATES PATENT AND TRADEMARK OFFICE
CERTIFICATE OF CORRECTION

PATENT NO. : 6,821,336 B1
DATED : November 23, 2004
INVENTOR(S) : Ramme et al.

It is certified that error appears in the above-identified patent and that said Letters Patent is hereby corrected as shown below:

Column 14,
Line 61, "exceed ed" should be -- exceeded --.

Column 15,
Line 17, "hour s" should be -- hours --.

Signed and Sealed this

Thirty-first Day of May, 2005

JON W. DUDAS
*Director of the United States Patent and Trademark Office*